UNITED STATES PATENT OFFICE.

IGNAZ KREIDL, OF VIENNA, AUSTRIA-HUNGARY.

PROCESS OF PRODUCING A FILLER FOR WHITE ENAMELS REISSUED 1,024,405.   Specification of Letters Patent.   Patented Apr. 23, 1912.

No Drawing.   Application filed May 29, 1911. Serial No. 630,157.

*To all whom it may concern:*

Be it known that I, IGNAZ KREIDL, a subject of the Emperor of Austria-Hungary, residing at XXI Kohlgasse 5–9, Vienna, in the Empire of Austria-Hungary, have invented a new and useful Improved Process of Producing a Filler for White Enamel, of which the following is a specification.

My invention relates to an improved method for manufacturing a filler for white enamels.

It has already been proposed to use the chemically pure oxid of zirconium in connection with the manufacture of white enamels for rendering the same turbid or opaque. It has, however, been found that the covering power of the oxid of zirconium which is to form a substitute for the oxid of tin heretofore employed is relatively speaking very small and that in order to obtain the same turbid or cloudy effects which are obtainable with oxid of tin, it is necessary to use much greater quantities of oxid of zirconium than of oxid of tin. For this reason the substitution of the more costly oxid of zirconium for oxid of tin is too expensive to be adopted in actual practice. Further it has been proposed to employ natural or normal silicate of zirconium as clouding or thickening agent. Experiments carried out in this direction, however, have revealed that natural or normal silicate of zirconium only possesses a very weak clouding or thickening action, that is to say, it is only capable of rendering the enamel turbid or opaque to a very slight extent. It was therefore heretofore assumed that the silicates of zirconium could not be used at all as clouding or thickening agents.

This invention is based on the recognition of the fact that from the natural or from a normal silicate of zirconium by separation only of a portion of the silicic acid a voluminous product is obtained, which possesses an extremely great covering power. This voluminous product the manufacture of which is considerably cheaper than the manufacture of the chemically pure oxid possesses a considerably greater covering power than oxid of zirconium and also a greater covering power than oxid of tin.

It has been found that the voluminous product produced according to the invention, and if used in the same quantity as the oxid of tin, produces practically double the covering effect obtained with the latter. When used in the same quantity as the oxid of zirconium the voluminous product according to the invention contains less of the valuable zirconium than there is contained in the same quantity of zirconium oxid. From this it follows that the employment of the voluminous products according to the invention would be more economical even if the same were only to produce the same covering effect as produced by the oxid of zirconium.

The following method is, for instance, suitable for producing such voluminous products. The normal or natural silicates of zirconium are first of all finely powdered and freed from coloring admixtures by treating this powder with acids such as hydrochloric acid or the like. Thereafter these silicates are heated with carbonates or hydrates of the alkalis (preferably the carbonate or hydrate of sodium) or the like under such conditions that the result is not a hydrate and that preferably such a mass is obtained which can be freed from alkali or from the alkali salts avoiding at the same time a separation of the silicic acid. As experience has taught that melting or heating the silicate at very high temperatures with a great surplus of the alkalis produces à hydrate the same may be prevented either by using smaller quantities of alkalis or lower temperatures. A mass suitable for the purposes of this invention may for example be obtained if four times the quantity by weight of caustic soda is used for the process and a working temperature of 500 to 600° C. employed. When heating the mixture only a portion of the silicic acid will separate out and the whole structure will be loosened. The mass is then treated with water or weak acid so as to remove the alkalis or the like and the soluble silicates, by which means a separating out of the silicic acid is avoided. After having removed the solution there remains after having dried and eventually glowed a voluminous product. This voluminous product may also be obtained by syntheticism.

What I claim as my invention and desire to secure by Letters Patents is:

1. The process of producing a filler for white enamel consisting in freeing powdered silicate of zirconium from coloring matter by treatment with acid, then mixing it with four times the weight of caustic alkali, heating to a temperature of from 500 to 600 degrees centigrade, treating with a fluid to remove the alkali, drying and glowing.

2. The process of producing a filler for white enamel, consisting in freeing powdered silicate of zirconium from coloring matter by treatment with acid, then mixing it with caustic alkali, heating to between 500 and 600 degrees centigrade, washing out the alkali, drying and glowing.

3. The process of producing a filler for white enamel consisting in freeing powdered silicate of zirconium from coloring matter by treatment with acid, then mixing it with four times the weight of caustic soda, heating to between 500 and 600 degrees centigrade, washing out the alkali, drying and glowing.

In testimony whereof I have signed my name to this specification in the presence of two subscribing witnesses.

IGNAZ KREIDL.

Witnesses:
  HUGO REIK,
  AUGUST FUGGER.